United States Patent
Magno

(10) Patent No.: US 11,478,105 B2
(45) Date of Patent: Oct. 25, 2022

(54) AUTOMATIC HOT BEVERAGE PREPARATION MACHINE

(71) Applicant: EVOCA S.P.A., Milan (IT)

(72) Inventor: Alessandro Magno, Milan (IT)

(73) Assignee: EVOCA S.P.A., Milan (IT)

(*) Notice: Subject to any disclaimer, the term of this patent is extended or adjusted under 35 U.S.C. 154(b) by 506 days.

(21) Appl. No.: 16/615,938

(22) PCT Filed: May 30, 2018

(86) PCT No.: PCT/IB2018/053848
§ 371 (c)(1),
(2) Date: Nov. 22, 2019

(87) PCT Pub. No.: WO2018/220552
PCT Pub. Date: Dec. 6, 2018

(65) Prior Publication Data
US 2020/0093322 A1    Mar. 26, 2020

(30) Foreign Application Priority Data

May 30, 2017    (IT) .................... 102017000059018

(51) Int. Cl.
*A47J 31/54*    (2006.01)
*A47J 31/46*    (2006.01)
*A47J 31/40*    (2006.01)

(52) U.S. Cl.
CPC ............. *A47J 31/54* (2013.01); *A47J 31/461* (2018.08); *A47J 31/469* (2018.08); *A47J 31/407* (2013.01)

(58) Field of Classification Search
CPC ........ A47J 31/40; A47J 31/401; A47J 31/407; A47J 31/461; A47J 31/469; A47J 31/54

USPC .......................................................... 99/291
See application file for complete search history.

(56) References Cited

U.S. PATENT DOCUMENTS

| 4,757,754 A * | 7/1988 | Welker .................. A47J 31/007 |
|---|---|---|
| | | 99/291 |
| 7,231,279 B2 * | 6/2007 | Ghidotti .................. G07F 13/10 |
| | | 99/302 R |
| 10,779,678 B2 * | 9/2020 | Hsu ........................ A47J 31/401 |
| 2017/0035236 A1 | 2/2017 | Zhao et al. |

FOREIGN PATENT DOCUMENTS

| CN | 106028884 A | 10/2016 |
|---|---|---|
| EP | 2757925 B1 | 4/2015 |

OTHER PUBLICATIONS

International Preliminary Report on Patentability for International Application No. PCT/IB2018/053848 dated Jun. 4, 2019.
International Search Report and Written Opinion from International Application No. PCT/IB2018/053848 dated Sep. 3, 2018.

* cited by examiner

*Primary Examiner* — Reginald Alexander
(74) *Attorney, Agent, or Firm* — Dorsey & Whitney LLP

(57) ABSTRACT

An automatic hot beverage preparation machine comprising a hydraulic water supply circuit having a first branch to connect a water source and a water boiler, a second branch to connect the water boiler and a hot beverage dispensing assembly, a third branch to connect the first branch and the second branch, and a valve device to selectively control supply of water in the third branch as a function of a signal from a water temperature sensor arranged to measure water temperature at an outlet of the water boiler.

5 Claims, 2 Drawing Sheets

AUTOMATIC HOT BEVERAGE PREPARATION MACHINE

PRIORITY CLAIM

This application claims priority from Italian Patent Application No. 102017000059018 filed on May 30, 2017 and the content of which is incorporated by reference.

TECHNICAL FIELD OF THE INVENTION

The present invention relates to an automatic hot beverage preparation machine.

PRIOR ART

Known automatic hot beverage preparation machines comprise a water source; a water boiler to heat water; a hot beverage dispensing assembly; and a hydraulic water supply circuit comprising a first branch to connect the water source and the water boiler, a second branch to connect the water boiler and the hot beverage dispensing assembly, and a third branch to connect the hot beverage dispensing assembly and a hot beverage receptacle.

Generally, the hot beverage dispensing assembly comprises a plurality of dispensing devices to dispense respective types of hot beverages, for example coffee, chocolate, tea or the like.

The first branch comprises a water tank, a first water supply section extending between the water source and the water tank, a water second supply section extending between the water tank and the water boiler, and a water supply pump arranged along the second water supply section to circulate water in the hydraulic water supply circuit.

The second branch of the hydraulic water supply circuit comprises a water supply manifold connected to the water boiler and, for each dispensing device, a respective water supply duct connected to the water supply manifold through a valve assembly configured to selectively control supply of water in the water supply duct.

The third branch comprises, for each dispensing device, a respective duct to supply a hot beverage to the beverage receptacle.

The water boiler is associated with a first water temperature sensor to measure water temperature in the water boiler, and a second water temperature sensor to measure water temperature at an outlet of the water boiler.

US 2017/035236 A1 discloses an automatic cold beverage preparation machine comprising a water supply unit, water cooling means arranged downstream of the water supply unit, cold beverage dispensing means arranged downstream of water the cooling means, valve means arranged downstream of the water cooling means and upstream from the cold beverage dispensing means, and an electronic control unit adapted to operate the valve means to direct water from the water cooling means either in a loop back to the water cooling means for a further water cooling until cooled water reached a predetermined temperature.

In one embodiment, water temperature downstream of the water cooling means may be measured by means of a first temperature sensor arranged upstream from the valve means, and in particular at a water outlet of the water cooling means, so that, once the cold water temperature measured by the first temperature sensor reaches a predetermined set-point temperature, e.g. set in the electronic control unit by a predetermined pattern or by a user, the electronic control unit operates the valve means to direct water from the water cooling means to the cold beverage dispensing means.

In an alternative embodiment, water temperature downstream of the water cooling means is not measured, but the electronic control unit is adapted to operate the valve means according to predetermined time patterns, which can be stored in a memory of the electronic control unit as stored programs, and computed based on former working cycles or offline experiments, such that to ensure that water temperature reaches the predetermined set-point temperature.

EP 2 757 925 A1 discloses an automatic beverage preparation machine to prepare hot or cold beverages by interaction between a beverage ingredient with hot or cold water, comprising a water source, a water pump connected to the water source to pump water from the water source, a water heater to heat the pumped water, a water cooler to cool the pumped water, at least one water outlet, a water feeding pipe to connect the water outlet to the water heater and to the water cooler, and a device for emptying the water feeding pipe and the water outlet after a beverage is dispensed.

OBJECT AND SUMMARY OF THE INVENTION

Above-described automatic hot beverage preparation machines have various drawbacks, mainly deriving from the fact that inactivity of the machine results in the cooling of the second branch and, thus, in the water temperature at an outlet of the water boiler and in the water supply manifold lower than a threshold temperature needed for an appropriate hot beverage dispensing.

It is an object of the present invention to provide an automatic hot beverage preparation machine which is free form the aforesaid drawbacks and is cheap and easy to use.

According to the present invention, an automatic hot beverage preparation machine is provided, as claimed in the appended claims.

BRIEF DESCRIPTION OF THE DRAWINGS

The present invention will now be described with reference to the appended drawings, which illustrate a non-limiting embodiment thereof, wherein.

DETAILED DESCRIPTION OF PREFERRED EMBODIMENTS OF THE INVENTION

The present invention will now be described in detail with reference to the appended figures to allow a person skilled in the art to produce it and use it. Various modifications to the embodiments described will be immediately clear to those skilled in the art and the general principles described can be applied to other embodiments and applications without going beyond the protective scope of the present invention, as defined in the appended claims. Thus, the present invention shall not be considered limited to the described and illustrated embodiments, but it must be given the widest protective scope in accordance with the described and claimed features.

Figure 1:
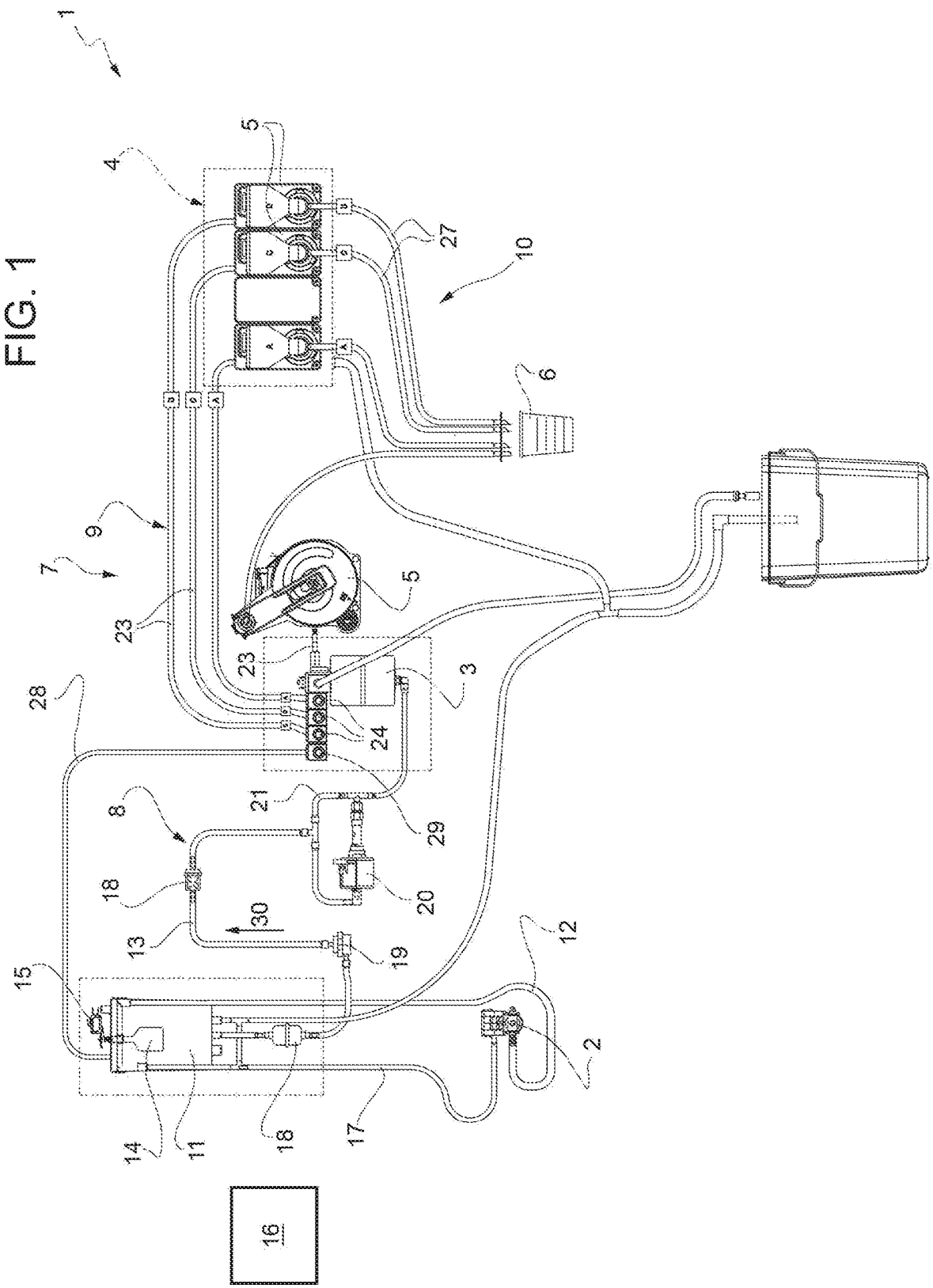
FIG. 1 schematically shows a preferred embodiment of an automatic hot beverage preparation machine.
Figure 2:
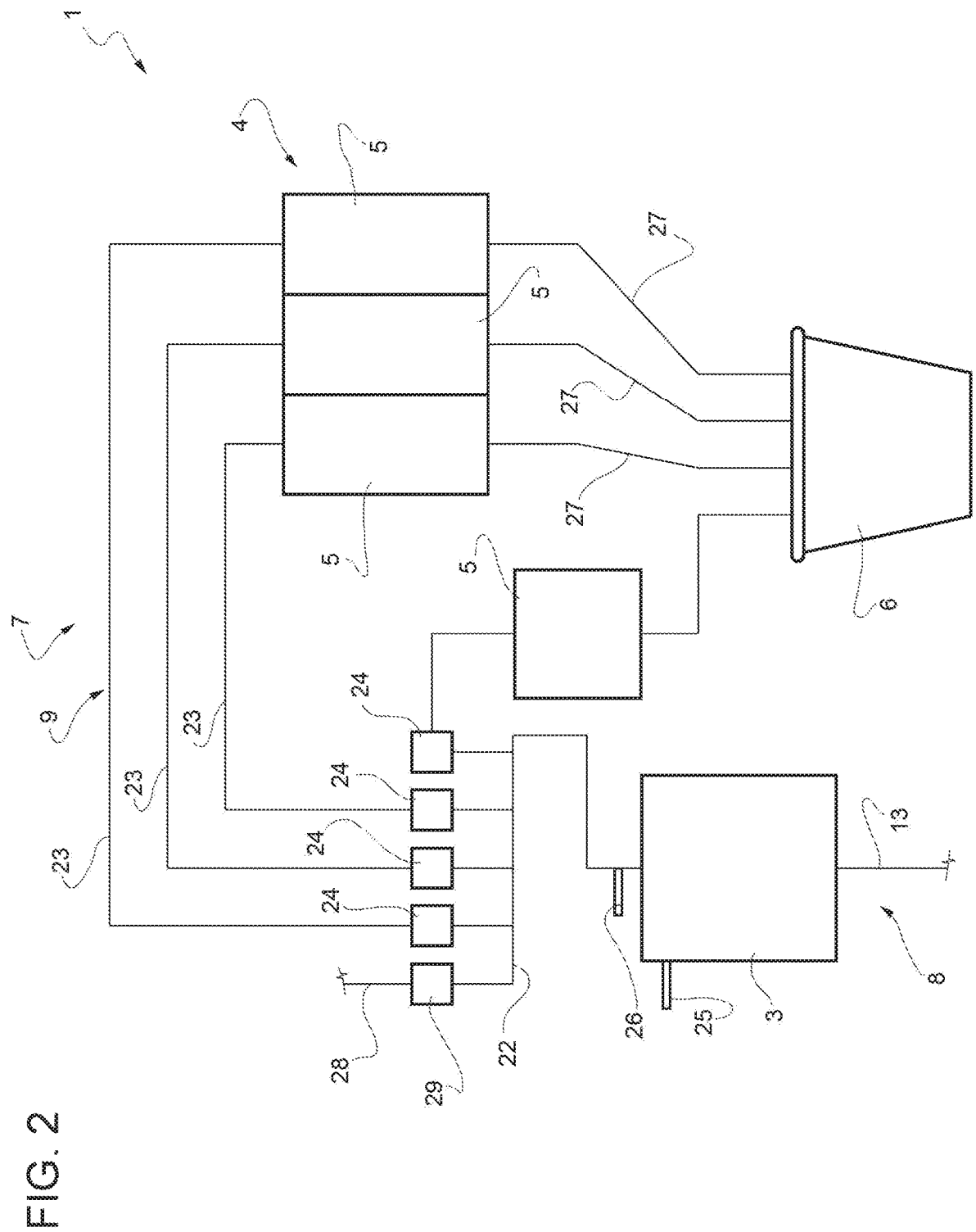
FIG. 2 schematically shows a detail of the automatic hot beverage preparation machine of FIG. 1.

With reference to FIGS. 1 and 2, an automatic hot beverage preparation machine is referenced as a whole by reference numeral 1.

The automatic hot beverage preparation machine 1 comprises a water source, in the embodiment shown a pneumatic dosing solenoid valve 2 connected to water mains; a water boiler 3; and a hot beverage dispensing assembly 4.

The hot beverage dispensing assembly 4 comprises a plurality of dispensing devices 5 of a known type (in the embodiment shown in the number of four) to dispense respective types of hot beverages, for example coffee, chocolate, tea or the like, in a beverage receptacle 6.

In the embodiment shown, the dispensing devices 5 comprise mixing devices (of a known type) configured to receive water from the water boiler 3, to mix water with a powdered product supplied to the dispensing devices 5, and dispense the associated hot beverage; and a brewing assembly (of a known type) configured to produce beverages by means of a process of forced hot water percolation through a dose of material in powder or leaves.

The automatic hot beverage preparation machine 1 further comprises a hydraulic circuit 7 including a first branch 8 to connect the solenoid valve 2 and the water boiler 3, a second branch 9 to connect the water boiler 3 and the hot beverage dispensing assembly 4, and a third branch 10 to connect the hot beverage dispensing assembly 4 and the beverage receptacle 6.

The first branch 8 comprises a water tank 11, a first water supply section 12 extending between the solenoid valve 2 and the water tank 11, and a second water supply section 13 extending between the water tank 11 and the water boiler 3.

The water tank 11 comprises a float 14 mounted in the water tank 11 and carrying a movable part of a switch 15, whose fixed part is mounted outside the water tank 11.

The switch 15 is connected to an electronic control unit 16 configured to selectively control operation of the solenoid valve 2 as a function of a signal from the switch 15.

In the event of failure of the switch 15, the solenoid valve 2 is closed by the water discharged outside the water tank 11 by an overflow duct 17 extending between the water tank 11 and the solenoid valve 2.

As regards the above, it is pointed out that the water tank 11 serves a dual purpose inside the hydraulic circuit 7: on the one hand, it is a hygiene safety device because air in the water tank 11 above the free surface of the water prevents bacteria in the machine 1 from returning into the water mains; an on the other it is a water reserve, which, in the event of an interruption in the water supply from the water mains during a hot beverage dispensing, allows the machine 1 to complete the beverage preparation process without sudden stop.

The second water supply section 13 of the first branch 8 comprises a couple of filters 18 arranged in series, a flow rate meter 19 arranged between the filters 18, and a water supply pump 20 arranged between the filters 18 and the water boiler 3.

Lastly, the first branch 8 comprises a recirculation section 21 to recirculate water back to an inlet of the water pump 20 when water pressure in the water boiler 3 is greater than a determined threshold pressure.

The second branch 9 comprises a water supply manifold 22 connected to the water boiler 3, and, for each dispensing device 5, a respective water supply duct 23, which extends between the water supply manifold 22 and the respective dispensing device 5, and is connected to the water supply manifold 22 through a solenoid valve 24 connected to the electronic control unit 16.

Preferably, the solenoid valves 24 are arranged adjacent one to another so as to form a compact valve assembly and have respective inlets connected in parallel to the water supply manifold 22 and respective outlets connected to the respective supply ducts 23.

Preferably, the solenoid valves 24 are physically joined such that respective inner ducts define, as a whole, the water supply manifold 22.

Furthermore, the water supply manifold 22 has preferably an inlet end directly connected to an outlet duct of the water boiler 3.

As shown in FIG. 2, a water temperature sensor 25 is associated with the water boiler 3 and electrically connected to the electronic control unit 16 to measure water temperature at an outlet of the water boiler 3. Preferably, the water temperature sensor 26 is arranged along the outlet duct of the water boiler 3, which outlet duct is connected to the inlet end of the water supply manifold 22. In a different embodiment, a further water temperature sensor 26 may be associated with the water boiler 3 and electrically connected to the electronic control unit 16 to measure water temperature in the water boiler 3.

The third branch 10 comprises, for each dispensing device 5, a respective water supply duct 27 extending between the beverage receptacle 6 and the dispensing device 5.

The hydraulic circuit 7 further comprises a fourth branch 28, which extends between the water supply manifold 22, in particular the second branch 9, and the water tank 11, in particular the first branch 8, and is connected to the water supply manifold 22 by through a recirculation solenoid valve 29 connected to the electronic control unit 16.

Preferably, the solenoid valve 29 is arranged adjacent, and in parallel, to the solenoid valves 24 at an end of the water supply manifold 22, opposite to the inlet end of the water supply manifold 22, so resulting in the solenoid valve 29 being arranged downstream of the solenoid valves 24, in a direction in which hot water flows in the water supply manifold 22.

In an embodiment not shown, the fourth branch 28 extends between the solenoid valve 29 and the second water supply section 13, and is connected thereto upstream from the water pump 20 in a direction 30 in which water flows in the second water supply section 13.

During operation, when the water pump 20 is operated, when water temperature measured by the water temperature sensor 26 at the outlet of the boiler 3 is lower than a determined threshold temperature, the electronic control unit 16 causes the dispensing solenoid valves 24 to close and the recirculation solenoid valve 29 to open, whereby preventing hot water from flowing from the water boiler 3 to the hot beverage dispensing assembly 4, but causing hot water to be recirculated in the water tank 11. In this way, going from the water boiler 3 to the fourth branch 28, water flows along the water supply manifold 22, with the consequent heating of the latter and the dispensing solenoid valves 24.

Unlike, when water temperature measured by the water temperature sensor 26 at the outlet of the boiler 3 is at least equal to the aforesaid threshold temperature, the electronic control unit 16 causes the dispensing solenoid valves 24 to selectively open, and the recirculation solenoid valve 29 to close, so as to cause water to be supplied from the water boiler 3 to the dispensing devices 5.

In an operating mode, the electronic control unit 16 is configured to cause the solenoid valves 24 to close and the solenoid valve 29 to open when the automatic hot beverage preparation machine 1 is restarted after an inactivity period of time.

In a further operating mode, the electronic control unit 16 is configured to cause the solenoid valves 24 to close and the solenoid valve 29 to open after a settable inactivity period of time of the automatic hot beverage preparation machine 1.

The automatic hot beverage preparation machine 1 exposes various advantages, mainly deriving from the fact that the recirculation of hot water, from the water boiler 3 through the solenoid valve 29 and along the fourth branch 28, allows the water supply manifold 22 and the dispensing solenoid valves 24 to be heated up during and/or after an inactivity period of time of the automatic hot beverage preparation machine 1, and hot beverages to be dispensed appropriately only when water temperature at the outlet the water boiler 3 measured by the water temperature sensor 26 is at least equal to the aforesaid threshold temperature.

The invention claimed is:

1. An automatic hot beverage preparation machine, comprising:
    a water source;
    a water boiler to heat water;
    a hot beverage dispensing assembly;
    a hydraulic water supply circuit including:
        a first branch to connect the water source and the water boiler;
        a second branch to connect the water boiler and the hot beverage dispensing assembly;
        first electronically controllable valve devices to selectively supply water in the second branch;
        a water temperature sensor to measure water temperature at an outlet of the water boiler;
        a third branch to connect the first branch and the second branch; and
        a second electronically controllable valve device to selectively supply water in the third branch;
        wherein the second branch includes a water supply manifold arranged between the water boiler and the first and second electronically controllable valve devices, wherein the first and second electronically controllable valve devices have respective water inlets connected to the water supply manifold;
    wherein the hot beverage dispensing assembly includes a plurality of dispensing devices to dispense respective types of hot beverages; and the hydraulic water supply circuit includes a plurality of said first electronically controllable valve devices, one for each of the plurality of dispensing devices;
    wherein the first electronically controllable valve devices are arranged adjacent one to another so as to form a compact valve assembly and have respective inlets connected in parallel to the water supply manifold and respective outlets connected to the respective dispensing devices;
    wherein the first electronically controllable valve devices are physically joined together such that respective inner ducts define, as a whole, the water supply manifold;
    wherein the second electronically controllable valve device is arranged downstream of the first electronically controllable valve devices in the direction along which hot water flows in the water supply manifold; and
    an electronic control unit electrically connected to the water temperature sensor and to the first and second electronically controllable valve devices, and configured to control the first and the second electronically controllable valve devices based on the water temperature at the outlet of the water boiler to cause, until the first and second electronically controllable valve devices reach a predetermined thermal regime, hot water to be prevented from being supplied to the hot beverage dispensing assembly through the second branch and the first electronically controllable valve device, but to be supplied to the third branch through the second electronically controllable valve device to heat the first and the second electronically controllable valve devices and bring the first and the second electronically controllable valve devices to said predetermined thermal regime.

2. The automatic hot beverage preparation machine of claim 1, wherein the electronic control unit is further configured to cause the first electronically controllable valve devices to close and the second electronically controllable valve device to open, when water temperature at the outlet of the water boiler is lower than a threshold temperature, so as to heat the first and second electronically controllable valve devices and bring the first and the second electronically controllable valve devices to said predetermined thermal regime, and to cause the first electronically controllable valve devices to open and the second electronically controllable valve device to close, when water temperature at the outlet of the water boiler is higher, or equal to, a threshold temperature, so as to cause hot water from the water boiler to be supplied to the hot beverage dispensing assembly.

3. The automatic hot beverage preparation machine of claim 1, wherein the first branch includes a water tank, a first water supply section extending between the water source and the water tank, and a second water supply section extending between the water tank and the water boiler; and wherein the third branch is connected between an outlet of the second valve electronically controllable device and one of the water tank and the second supply section.

4. The automatic hot beverage preparation machine of claim 3, wherein the hydraulic water supply circuit further includes an overflow duct to re-circulate water from the water tank to the water source.

5. The automatic hot beverage preparation machine of claim 1, wherein the second electronically controllable valve device is arranged adjacent, and in parallel, to solenoid valves, at an end of the water supply manifold, opposite to the inlet end of the water supply manifold, so as to form a compact valve assembly with the first electronically controllable valve devices.

* * * * *